United States Patent [19]

Larsson

[11] Patent Number: 5,204,878
[45] Date of Patent: Apr. 20, 1993

[54] METHOD OF EFFECTING CHANNEL ESTIMATION FOR A FADING CHANNEL WHEN TRANSMITTING SYMBOL SEQUENCES

[75] Inventor: Lars G. Larsson, Svartviksslingan, Sweden

[73] Assignee: Telefonaktiebolaget L M Ericsson, Stockholm, Sweden

[21] Appl. No.: 620,710

[22] Filed: Dec. 3, 1990

[30] Foreign Application Priority Data

Dec. 22, 1989 [SE] Sweden .................. 8904327-7

[51] Int. Cl.$^5$ ............................................ H04L 27/01
[52] U.S. Cl. ....................................... 375/14; 375/94
[58] Field of Search ................. 364/724.2; 371/43, 44, 371/45; 375/11, 13, 14, 94, 106

[56] References Cited

U.S. PATENT DOCUMENTS

| | | | |
|---|---|---|---|
| 4,475,211 | 10/1984 | Mattis, Jr. et al. | 375/15 |
| 4,539,690 | 9/1985 | Speidel | 375/13 |
| 4,564,952 | 1/1986 | Karabinis et al. | 375/14 |
| 4,635,276 | 1/1987 | Karabinis | 375/15 |
| 4,718,073 | 1/1988 | Takaoka | 375/14 |
| 4,811,360 | 3/1989 | Potter | 375/11 |
| 4,935,183 | 8/1990 | Bergmanns et al. | 375/14 |
| 5,031,193 | 7/1991 | Atkinson | 375/13 |

OTHER PUBLICATIONS

Dominique N. Godard, "Self-Recovering Equalization and Carrier Tracking in Two Dimensional Data Communication Systems", *IEEE Transactions on Communications*, vol. COM-28, No. 11, Nov. 1980.

William C. Y. Lee, "Received-Signal Envelope Characteristics" and Received-Signal Phase Characteristics, *Mobile Communications Engineering*, Chapters 6 and 7, pp. 169-233.

"Adaptive Maximum-Likelihood Sequence Estimation for Digital Signaling in the Presence of Intersymbol Interference" in *IEEE Transactions of Information Theory*, Jan. 1973, pp. 120-124 by Magee, Jr. and Proakis.

Primary Examiner—Benedict V. Safourek
Attorney, Agent, or Firm—Burns, Doane, Swecker & Mathis

[57] ABSTRACT

Symbols in a symbol sequence transmitted via a fading channel are estimated in an equalizer having a channel estimating filter. An error signal influences an adaptation circuit which controls adjustable coefficients so as to form a channel estimate, which is adapted during the whole of the symbol sequence. The adaptation circuit performs an adaptation algorithm, which is influenced by mean energy values obtained from the channel estimate in a mean-value-forming circuit. Subsequent to fading the adaptation algorithm is able to control the coefficients so that one of the coefficients will erroneously dominate the channel estimate, with erroneous estimation of symbols as a result. This is counteracted by selecting the largest of the mean energy values, this largest value influencing the adaptation algorithm. When the signal strength of the transmitted symbols falls beneath a threshold value, the coefficient which dominated the channel estimate, for instance the first coefficient is sustained to also dominate after fading and the remaining coefficients are set to zero.

8 Claims, 4 Drawing Sheets

METHOD OF EFFECTING CHANNEL ESTIMATION FOR A FADING CHANNEL WHEN TRANSMITTING SYMBOL SEQUENCES

TECHNICAL FIELD

The present invention relates to a method for effecting channel estimation for a fading channel when transmitting symbol sequences, wherein each of the symbol sequences has at least one synchronizing sequence and one data sequence, said method comprising the steps of:
  effecting a channel estimation partly with the aid of the synchronizing sequence and partly by adaptation during the data sequence with the aid of a desired adaptation algorithm, wherein at least one channel estimate is obtained at each sampling time point, and
  effecting channel equalization with the aid of the channel estimate and estimation of symbols in the symbol sequences.

BACKGROUND ART

One problem which often occurs in radio transmissions over a channel is that a transmitted signal is subjected to multipath propagation and noise. In the case of mobile telephony for instance, the transmission properties of the channel will shift due to a change in the mutual positions of the transmitter and receiver. These problems have been solved in time-shared, digital radio transmission systems, in that the time-slot transmitted signal sequences include a synchronizing sequence and a data sequence. The synchronizing sequence is known to the receiver and the receiver is able to evaluate the transmission properties of the channel, i.e. effect a channel estimate, on the basis of this sequence. With the aid of this channel estimate, the receiver is able to evaluate the symbols of the data sequence which contains the information to be transmitted.

However, in certain instances it has been found insufficient to effect a channel estimate only once with each time slot. In the case of time slots of long duration, i.e. in the order of several milliseconds, the transmitter and receiver have sufficient time to change their mutual positions considerably during the course of a time slot. Consequently, the transmission properties of the channel can change radically during the duration of the time slot, so that the receiver estimation of the transmitted symbols becomes deficient and the transmitted information contains interferences. A radio receiver in which these interferences are partially avoided is found described in an article in IEEE Transactions On Information Theory, January 1973, pages 120–124, F. R. Magee Jr and J. G. Proakis: "Adaptive Maximum-Likelihood Sequence Estimation for Digital Signaling in the Presence of Intersymbol Interference". The article describes an equalizer which includes a viterbianalyzer equipped with an adaptation filter as a channel estimating circuit.

The equalizer described in this article partially overcomes those problems which occur with long time slots, although it has the disadvantage of lacking the ability to perform a correct adaptation after fading, during which the signal strength falls beneath the noise level. After fading has taken place the equalizer has difficulty in re-adapting to the data sequence, which is a sequence unknown to the receiver.

Fading occurs as a result of signal interference between signals reflected along mutually separate paths, such that fading often recurs for a mobile receiver which moves in the interference pattern of the signals. This can result in a large proportion of transmitted signal sequences being subjected to fading, so that a large part of the transmitted information will be lost. A solution to the problem of adapting to an unknown signal sequence is given in an article in IEEE Transactions on Communications, Vol Com-28, No. 11, November 1980, D. N. Godard: "Self-Recovering Equalization and Carrier Tracking in Two-Dimensional Data Communication Systems". Equalizer adaptation in the event of intersymbol interference is achieved by the introduction of an algorithm with a new type of cost functions and by minimizing these functions. The algorithm, however, converges relatively slowly and cannot be utilized when desiring to adapt an equalizer during one of the aforesaid time slots with a duration in the order of milliseconds.

DISCLOSURE OF THE INVENTION

The aforesaid problem of adapting an equalizer rapidly with the aid of an unknown signal is solved in accordance with the invention by forming successively the mean energy values of the channel estimate. This formation of the mean values is effected over a period of time of such long duration as to render the influence of fading on the mean values negligible. An adaptation algorithm is influenced by the mean energy values formulated in a manner to obtain renewed, correct channel estimation after fading.

The invention is characterized by the features set forth in the following claims.

BRIEF DESCRIPTION OF THE DRAWINGS

An exemplifying embodiment of the invention will now be described in more detail with reference to the accompanying drawings, in which.

BEST MODE OF CARRYING OUT THE INVENTION

Figure 1:
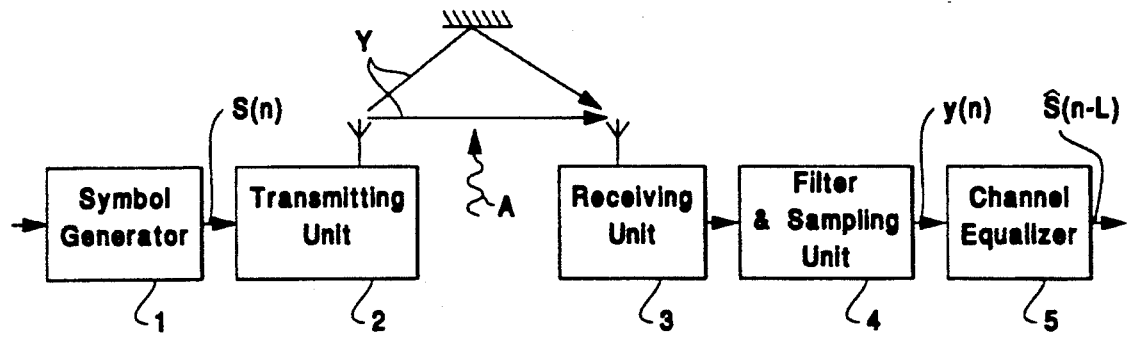
FIG. 1 illustrates schematically a radio transmission system comprising a transmitter, a receiver and an intermediate disturbed channel.
Figure 2:
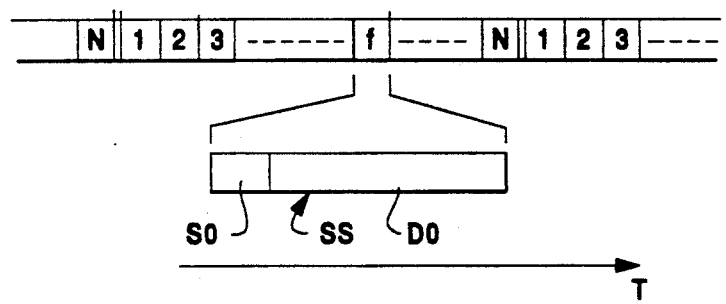
FIG. 2 illustrates time slots for a time-shared transmission system and a time slot signal sequence.
Figure 3:
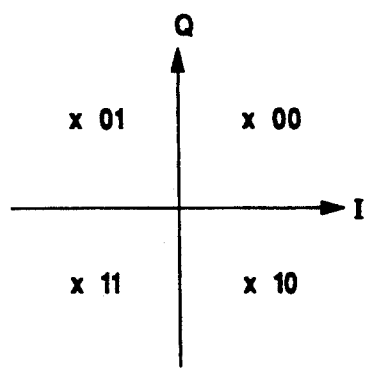
FIG. 3 is a diagram which shows the separate values of a transmitted symbol.

FIG. 1 illustrates schematically a known radio transmission system for time-shared radio communication. A transmitter has a unit (1) which generates digital symbols $S(n)$. These symbols are digital/analogue converted and transmitted as a signal Y from a unit 2 to a receiving unit 3 of a receiver. The received signal is filtered and sampled in unit 4 to form a received digital signal $y(n)$, which is delivered to a channel equalizer 5. This equalizer delivers at given time delays, estimated symbols $S(n-L)$ which constitute an estimation of the transmitted signals S(n). The sign (n) denotes a sampling time point with number n and the reference sign (n−L) denotes that the estimated symbols are delayed by a number of L sampling intervals. The double signal paths in FIG. 1 indicate that the channel between the units 2 and 3 subjects the transmitted signal Y to time dispersion. A disturbance signal on the same channel as that used between the units 2 and 3 is indicated by a signal A. As will be explained herebelow, transmission is also disturbed by signal fading. As beforementioned, the radio transmission system is time-shared with mutually separate time slots 1−N, according to FIG. 2, in which the capital letter T indicates time. It is possible to transmit in each time slot f a signal sequence SS which includes a synchronizing sequence SO and a data sequence DO that contains the information to be transmitted. The signal sequence SS includes binary signals, although the aforesaid symbols S(n) are modulated in accordance, for instance, with QPSK-modulation, as illustrated in FIG. 3. In a complex speech plan with the axes referenced I and Q, the four possible values of the symbols S(n) are marked one in each quadrant with the binary numbers 00, 01, 10 or 11. The time taken to transmit one such modulated symbol is referred to as a symbol time TS.

Figure 4:
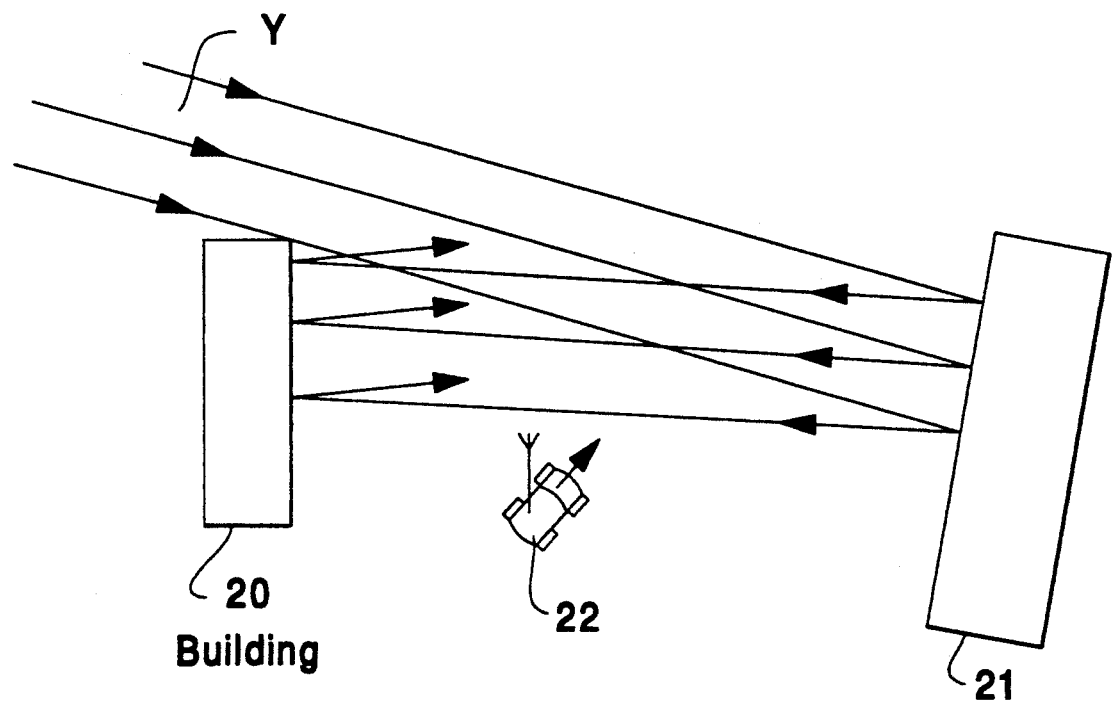
FIG. 4 illustrates a mobile receiver which moves in an interference pattern between two buildings.

The aforesaid signal fading, so-called Rayleigh-fading, occurs in the following way. FIG. 4 illustrates two buildings 20 and 21 which reflect the transmitted signal Y. It is assumed in this case that essentially one of the signal paths in FIG. 1 reaches the region between the buildings 20 and 21, so-called single beam propagation of the signal Y. The reflected signals interfer with one another between the buildings. When the difference in propagation time of interfering signals is less than approximately TS/4, a regular interference pattern can occur with alternating maxima and nodes in signal strength. A mobile receiver 22 which moves through the interference pattern will repeatedly pass the nodes, where the signal strength is very low. A more exhaustive description of fading is found in William C. Y. Lee: Mobile Communications Engineering, Chapter 6 and 7, McGRaw-Hill, Inc. 1982.

Figure 5:
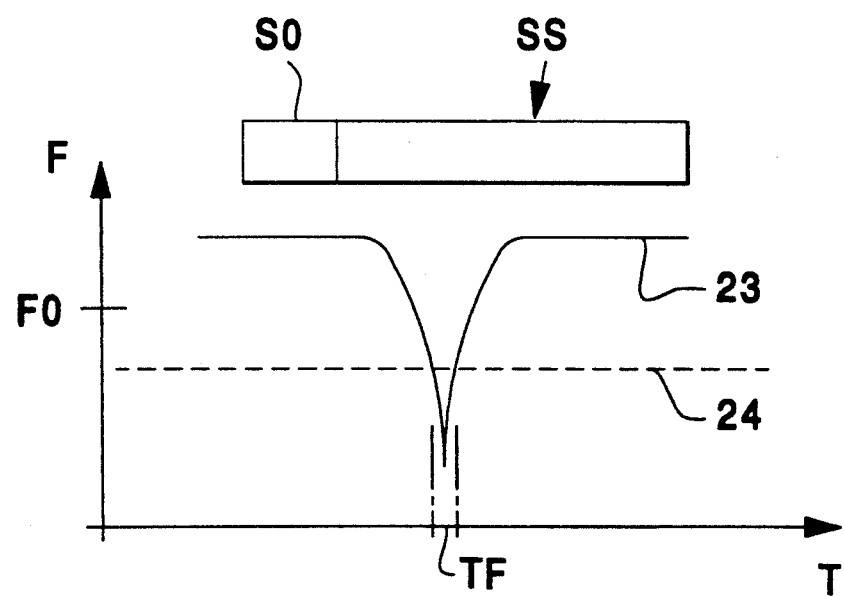
FIG. 5 is a diagram which shows the variation in signal strength during a signal sequence.

FIG. 5 shows a curve 23 which illustrates how the signal strength, the absolute value of Y and referenced F, can vary in respect of the mobile 22 during the time duration of the signal sequence SS. The noise level is shown with a broken line 24 and the Figure illustrates how the signals strength F falls beneath the noise level during a time interval TF.

As mentioned in the aforegoing, the channel equalizer 5 of the mobile 22 is preferably adaptive in the case of long signal sequences SS, which have a time duration of several milliseconds. The adaptation filter of the equalizer can then be adapted to quickly shifting transmission properties of the transmission channel. In the case of known filters, however, this adaptation possibility has the disadvantage that said filters will also adapt to the low signal strength when the fading illustrated in FIG. 5 occurs. When the signal strength F increases subsequent to fading, it is possible that erroneous adaptation will occur such that the estimated signal S (n−L) will have a large bit-error content and that the information in the signal sequence SS will be lost after fading. The object of the present invention is to enable adaptive channel estimation to be effected in the equalizer 5 without this disadvantage.

Figure 6:
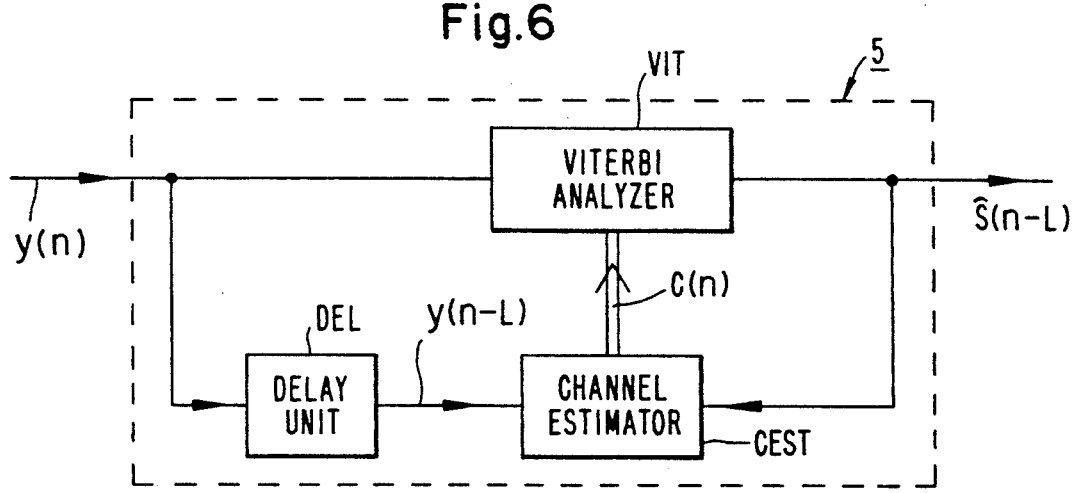
FIG. 6 is a block schematic of a viterbi equalizer provided with an inventive channel estimation filter.

As will be seen from the schematic illustration of FIG. 6, the equalizer 5 comprises a viterbi analyzer VIT, an adaptive channel estimating filter CEST, and a delay circuit DEL. The viterbi analyzer VIT receives the signal y(n) and produces the symbols S(n−L), which have been estimated in a known manner with the delay of L sampling steps. The channel estimating filter CEST receives the estimated symbols S (n−L) and also the signals y(n−L), which are the received signals y(n) delayed through L sampling steps in the delay circuit DEL. The channel estimating filter CEST receives the signal y(n−L) and the estimated symbols S (n−L), and delivers to the viterbi analyzer VIT an estimated impulse response, a channel estimate, C(n) for the channel. It should be noted that in addition to including the actual radio channel itself, the channel estimate also includes transmitter and receiver filters. Alternatively, a preliminary decision from the viterbi analyzer VIT can be utilized instead of the estimated symbols S (n−L). This will result in a delay which is shorter than the L sampling steps or intervals. Estimation of the impulse response C(n) will be described in more detail herebelow with reference to FIG. 7. The viterbi equalizer 5 utilizes the synchronizing sequence SO to create a start value for C(n), which is then updated for each new sampling time point n.

Figure 7:
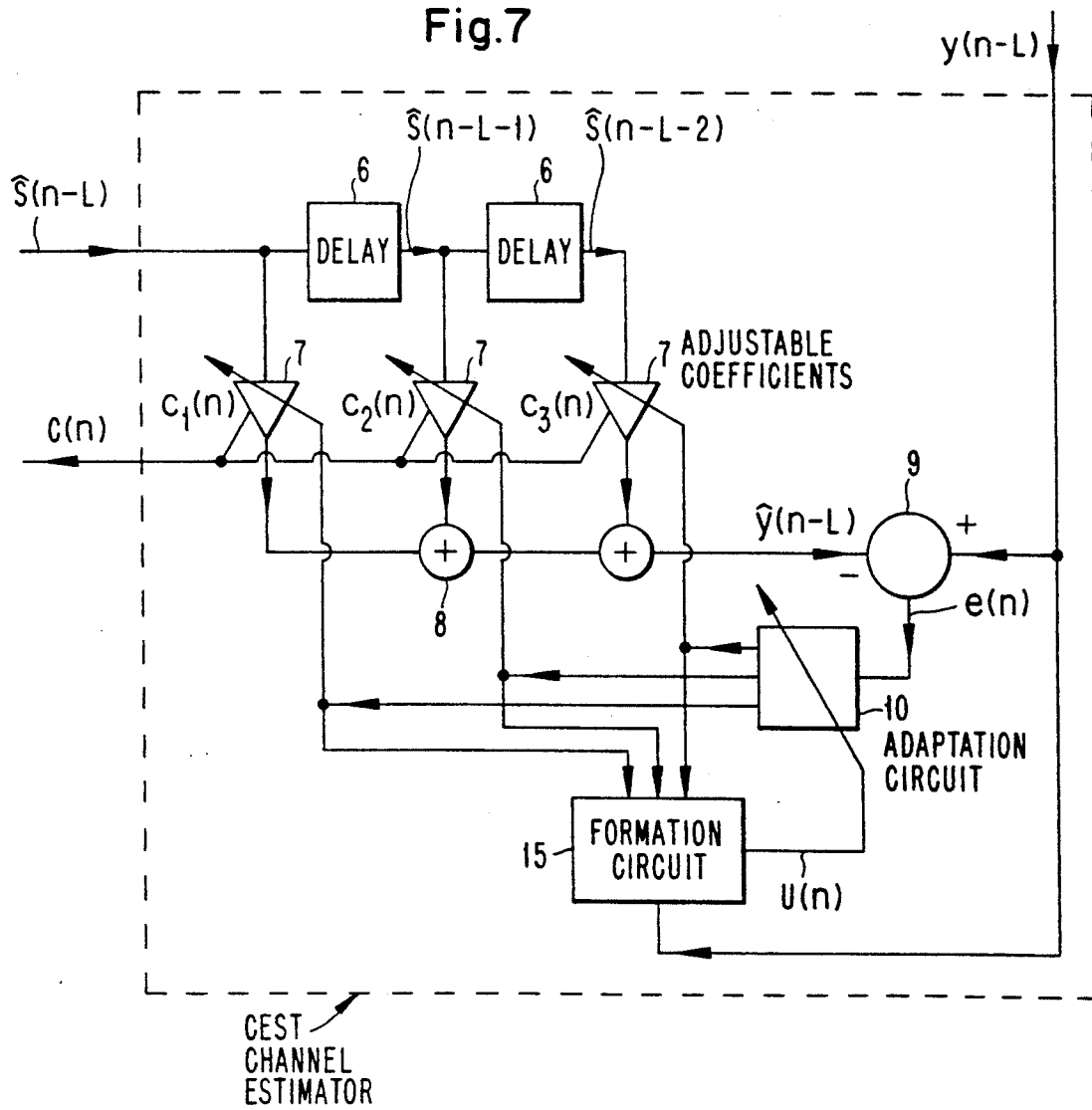
FIG. 7 is a circuit diagram of the inventive channel estimation filter.

The channel estimating filter CEST, shown in more detail in FIG. 7, includes the delay element 6, adjustable coefficients 7, summators 8, a difference former 9 and an adaptation circuit 10 which performs an adaptation algorithm. The adaptation circuit 10 is controlled from a mean-value formation circuit 15 which forms a time mean value U(n) of the energy in the channel estimate C(n). The number K of coefficients 7 will depend on the magnitude of time dispersion the channel can have expressed in a number of sampling intervals, and in the illustrated example K=3. The estimated symbols S(n−L) are delayed stepwise by one sampling time point in the delay elements 6 to form symbols S(n−L−1) up to S(n−L−K+1) which are multiplied by coefficients $c_1(n)$ ...$c_K(n)$. Subsequent to stepwise addition in the summators 8 to form a filtered estimated signal y(n−L) there is formed an error signal e(n) which is the difference between the signal y(n−L) and the delayed signal y(n−L) received. The adaptation circuit 10 receives the error signal e(n) and controls the coefficients 7 so as to minimize the error signal. The coefficients $c_1(n)$, ...$c_K(n)$ constitute the aforesaid estimated impulse response C(n). This can be described as a channel vector $C(n) = \{c_1(n) \ldots c_K(n)\}^T$, and correspondingly a signal vector can be defined by the relationship $S(n) = \{s(n-L), \ldots s(n-L-K+1)\}^T$. With the aid of these vectors, the error signal index T denotes a transposition. By formation of the mean value of the channel estimate energy C(n) is meant a formation of a time mean value $u_i(n)$ of the energy contained by each of the coefficients $c_1(n)$....$c_K(n)$ The mean value of the channel estimate energy U(n) can be expressed as $U(n) = \{u_1(n)....u_i(n),....u_K(n)\}^T$, which is calculated in accordance with the relationship $U(n) = U(n-1) + G\{|C(n)|^2 - U(n-1)\}$. In this connection, G is a constant which expresses the duration of the time interval over which formation of the mean values takes place. The duration of this time interval is selected so that during the time interval TF fading will have a negligible influence on the mean value, and the time interval can extend over several signal sequences SS. Primarily, only one synchronizing sequence SO in each signal sequence SS is utilized in the formation of a mean value. It is also possible, however, in accordance with the invention to utilize the whole of the signal sequence SS, so that all of the subsequently adapted channel estimates C(n) will be included in the calculation of the mean value U(n). The adaptive algorithm performed in the circuit 10 is controlled with the aid of the time mean value U(n) of the impulse response energy. For instance, when the adaptation algorithm is an LMS-algorithm, Least Mean Square, the channel estimate is calculated iteratively in accordance with the relationship $C(n) = Q \times C(n-1) + M \times S^*(n)e(n)$. In this case the index * is a complex conjugation. Q is a diagonal matrix with diagonal elements $q_1,...q_h,...q_k$ and M is a diagonal matrix with diagonal elements $M = \mu_1,...\mu_h,...\mu_k$. According to one alternative embodiment, this adaptation algorithm can be controlled in the following manner. The circuit 15 which forms said mean value detects when fading prevails through the signal $y(n-L)$, i.e. when the signal strength F falls beneath a threshold value FO, see FIG. 5. In the event of fading, the matrix M is constantly unaffected. One of the coefficients, for instance $q_h$, in the matrix Q is selected and is set to a desired value, for instance $q_h = 1$. The remaining coefficients are set to zero. The choice of coefficient is effected with the aid of the mean value of the channel estimate energy U(n), so that the selected coefficient $q_h$ will correspond to the largest coefficient $u_h(n)$ in the mean value U(n). As a result, that coefficient of the coefficients in the channel estimate C(n) which was dominant prior to fading will also dominate the channel estimate subsequent to fading, i.e. when the signal strength F again increases. When choosing a coefficient in the matrix Q it is assumed that the mutual relationship between the energy transmitted along the separate signal paths has not been changed to any appreciable extent during fading. Subsequent to fading, when the signal strength exceeds the threshold value FO, the coefficients in the matrix Q are set to their original values, which may be $q_i = 1$ in all instances for example.

The threshold value FO can be determined in several different ways. According to one simple alternative, FO may be constant. The drawback with this alternative, however, is the difficulty experienced in adapting to separate fading instances. In the case of a pronounced single beam illustrated in FIG. 4, where the signal Y reaches the area between the buildings 20 and 21 via practically solely one propagation path, one of the coefficients in C(n), for instance $c_1(n)$ will dominate. Thus, should the signal strength F begin to fall it will be positively known that fading has occurred and that the threshold value FO can be set to a relatively high level. When the signal strength falls beneath FO, $q_l$ is set to 1 and the remaining coefficients in the matrix Q are set to 0. However, it may be so that the single path propagation is less pronounced, so that the signal Y also reaches the region of the mobile 22 via a reflected propagation path. The reflected signal is relatively weak and the corresponding coefficient in the channel estimate C(n), for instance $c_2(n)$, is much smaller than $c_1(n)$. If the threshold value FO is constant and relatively high, fading will be indicated by the mean-value-forming circuit 15, also in this propagation instance when the signal strength F falls. Because the signal Y also reaches the mobile 22 via a reflected propagation path, fading will not occur, however, although the LMS-algorithm in the circuit 10 is still controlled by the circuit 15 as though fading had actually occurred. This impairs the transmission quality of the information in the data sequence DO. In order to avoid this, the threshold value FO can be determined in a more complicated method, in accordance with the following. It is desirable to take into account both the dominating coefficients in the channel estimate C(n), according to the example $c_1(n)$ and $c_2(n)$, which is the next largest coefficient. In this case, the threshold value FO can then be calculated in accordance with the relationship $FO^2 = H \cdot u_1(n)/u_2(n)$, where H is a constant. During the period over which the signal strength falls beneath the threshold value FO, $q_l$ is set to 1 and the remaining coefficients in the matrix Q are set to 0, in accordance with the aforegoing.

According to one alternative, channel estimation can be controlled with the aid of said LMS-algorithm in the following manner. The matrix Q is held constant throughout the whole period, for instance Q is the unit matrix. The coefficients in the matrix M are set to the values which correspond to the coefficients in the mean-value-forming channel estimate U(n), for instance $\mu_i = R\{u_i(n)|u_h(n)\}^{\frac{1}{2}}$ for $i = 1, ...., K$, where R is a constant and $u_h(n)$ is the largest of the energy values $u_i(n)$. The coefficients $\mu_i$ will hereby become weighting constants when controlling the LMS-algorithm. During a fading sequence, the time interval TF, the coefficients in the channel estimate C(n) will take very small values. Subsequent to fading, the coefficients $c_i(n)$ will be adapted at a speed proportional to the values $\mu_i$ in the matrix M. This means that the filter coefficient, described with the numeral value $c_h(n)$, which dominated the channel estimate C(n) over a period prior to fading, will be the quickest to recover when fading ceases. This alternative method of controlling the LMS-algorithm also assumes that the mutual relationship between the energy transmitted along the separate signal paths will not have changed to any appreciable extent during the actual course of fading. No indication that fading has occurred is required when controlling in accordance with this second alternative. The coefficients in the matrix Q may be constant over the whole period the coefficients $\mu_i$ in the matrix M can be calculated constantly with a starting point from the mean value of the impulse response energy formed in accordance with the above.

According to the described examples, an LMS-algorithm is performed in the circuit 10. The channel estimation can be effected, however, with other types of algorithms. One example in this respect is the RLS-algorithm, Recursive Least Squares, which is faster than the LMS-algorithm, but much more complicated.

Figure 8:
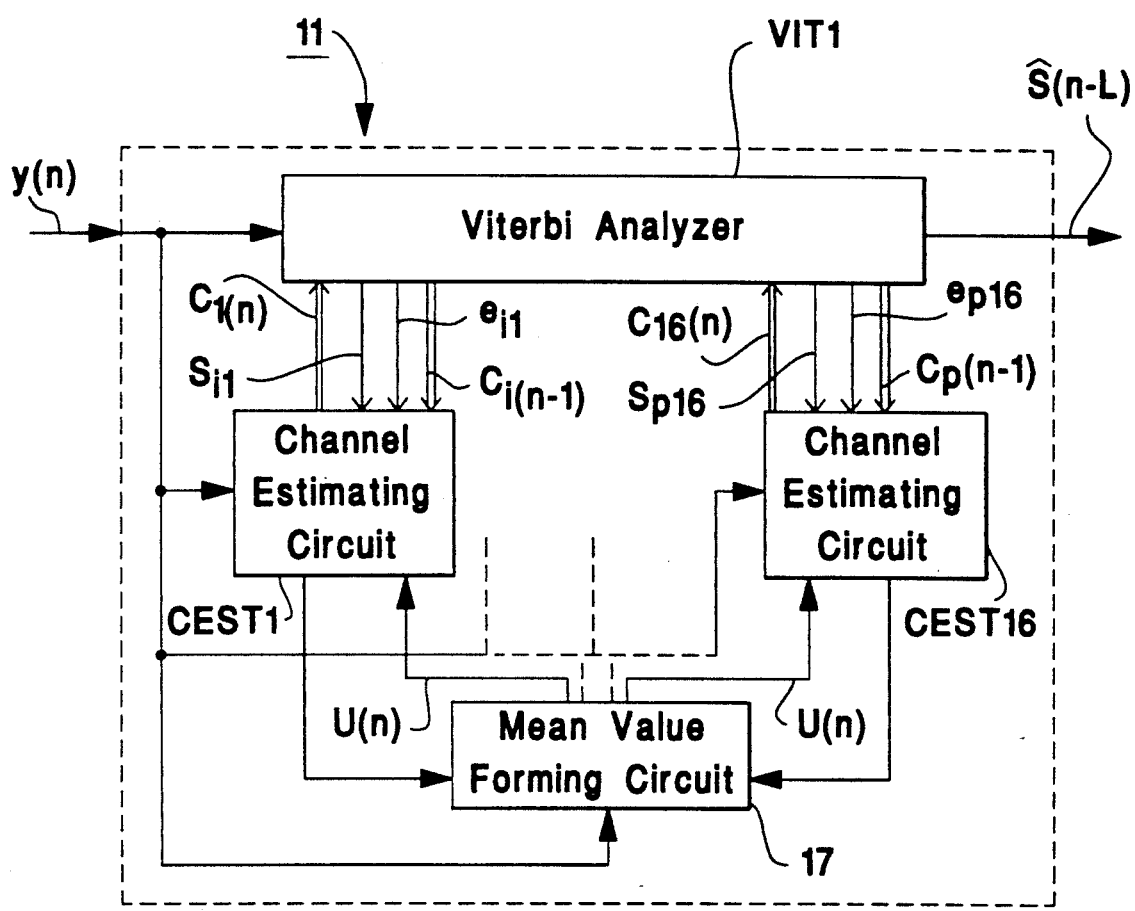
FIG. 8 is a block schematic which illustrates an alternative viterbi equalizer provided with an inventive channel estimation filter.

According to the above example, the equalizer 5 has only one circuit, for calculating the estimated impulse response C(n), i.e. the channel estimation filter CEST. However, it is possible, in accordance with the invention, to use an equalizer which possesses several circuits for estimating the channel impulse response, as illustrated in FIG. 8. A viterbi equalizer 11 includes a viterbi analyzer VIT1 with a number of states $P = 16$, and a channel estimating order which includes channel estimating circuits CEST1....CEST16. A separate channel estimate $C_i(n)$ is formed in these circuits for each state i of the viterbi algorithm. The viterbi analyzer VIT1 receives the signal y(n) at the sampling time point n and produces the estimated symbol $S(n-L)$ after a delay corresponding to L sampling intervals in the same manner as that described for the viterbi analyzer VIT. All of the channel estimating circuits are connected to the viterbi analyzer VIT1 and an estimation of one of the part estimates $C_1(n) .... C_{16}(n)$ is effected in each of the channel estimating circuits. The part estimate $C_i(n)$ for the new state j at the sampling time point n is calculated iteratively from the part estimate $C_i(n-1)$ for the old state i at a preceding sampling time point $(n-1)$. $C_i(n-1)$ is the channel estimate which belongs to the path selected by VIT1 at the transition of state i to state j. $C_j(n)$ is calculated with the aid of a transition error signal $e_{ij}(n)$, which is calculated according to the relationship $e_{ij}(n) = y(n) - C_i^T(n-1) \cdot S_{ij}$. In this case $S_{ij}$ a transition vector with symbols for the old state i and the new state j. The part estimate $C_j(n)$ for the new state j at the sampling time point n is calculated in the j:th channel estimating circuit according to the desired algorithm, for instance the aforesaid LMS-algorithm, which gives $$C_j(n) = C_i(n-1) + \cdot S_{ij}^* \cdot e_{ij}(n).$$

In FIG. 8 the channel estimation has been illustrated for the first and the last state 1 and 16 respectively. At the sampling time point n, the viterbi analyzer VIT1 selects a transition from the state i to the state 1 and delivers the transition vector $S_{il}$, the transition error signal $e_{il}$ and the old part estimate $C_i(n-1)$ to the channel estimating circuit CEST1. The new part estimate $C_l(n)$ is calculated in the circuit CEST1 and is delivered to VIT1 for use at the next time point $(n+1)$ in the viterbi detection, for continued iterative calculation of the part estimates. In a similar manner, the viterbi analyzer VIT1 selects a transition from the state p to the state 16 and delivers the transition vector $S_{p16}$, the transition error signal $e_{p16}$ and the old part estimate $C_p(n-1)$ to CEST16. The new part estimate $C_{16}(n)$ is calculated and delivered to VIT1. Each of the channel estimating circuits CEST1 up to and including CEST16 is connected to a mean value forming circuit 17. This circuit controls the adaptation algorithm through the signal U(n) in a manner corresponding to that described with reference to the mean value forming circuit 15 of the channel estimating filter CEST according to FIG. 7. The circuit 17 utilizes, for instance, the channel estimate obtained with the aid of solely the synchronizing sequences SO for its mean-value-forming function.

In the aforegoing the invention has been described with reference to the equalizers 5 and 11, both of which have viterbi analyzers VIT and VIT1 respectively. The invention permits, however, the use of other types of equalizer, which are connected to channel estimating circuits whose adaptation algorithm is controlled with the aid of the mean energy value U(n) for the channel estimate C(n).

What is claimed is:

1. A method for effecting channel estimation for a fading channel when transmitting a signal comprising symbol sequences, wherein each of the symbol sequences has at least one synchronizing sequence and one data sequence, said method comprising the steps of:
   sampling said signal at a series of sampling time points to obtain a series of signal samples;
   generating a channel estimate having plural coefficients, based on knowledge of said synchronizing sequence, for said fading channel at each sampling time point;
   estimating values of symbols in a symbol sequence of said signal based on said signal samples and said channel estimate;
   adapting said channel estimate according to an adaptation algorithm, based on knowledge of said channel estimate as applied to signal samples corresponding to said data sequence;
   calculating mean energy values of said channel estimate by forming a time mean value over multiple sampling time points of energy represented by each of the coefficients of the channel estimate;
   selecting at least the largest of the mean energy values; and
   influencing the adaptation algorithm in dependence on the selected mean energy values, such that adaptation of the channel estimate is controlled with the aid of the selected mean energy values enabling a correct estimation to be made of symbols in a remaining part of the symbol sequence subsequent to fading during the symbol sequence.

2. A method according to claim 1 wherein said mean energy values are calculated over one or more whole symbol sequences.

3. A method according to claim 1 wherein said mean energy values are calculated over solely the synchronizing sequence of one or more of the symbol sequences.

4. A method according to claim 1, in which the adaptation algorithm is a least mean square algorithm which, at the sampling time points, calculates a value for the channel estimate with the aid of an error signal at the latest sampling time point, and comprising the further step of determining weighing factors based on the selected mean energy values, wherein the adaptation algorithm is influenced by weighing said error signal into the channel estimate with the aid of said weighing factors.

5. A method according to claim 4, wherein the weighing factors are proportional to the square root of a quotient between the mean energy value that corresponds to each weighing factor and the largest mean energy value.

6. A method according to claim 1, in which the algorithm is a least mean square algorithm which, at the sampling time points, calculates a value for the channel estimate based on the channel estimate for the preceding sampling time point, further comprising the steps of:
   detecting signal strength of the transmitted signal;
   determining a threshold value for the signal strength;
   determining the occurrence of fading by comparing the signal strength with the threshold value; and
   in the event of fading, causing the adaptation algorithm to form the channel estimate based solely on those coefficients in the channel estimate for the preceding sampling time point which correspond to the selected mean energy values.

7. A method according to claim 6, wherein the threshold value for the signal strength is a predetermined value.

8. A method according to claim 6, wherein the threshold value of the signal strength is proportional to the square root of the quotient between the largest and the next largest of the man energy values.

* * * * *